United States Patent
Halageri et al.

(10) Patent No.: US 12,068,854 B2
(45) Date of Patent: *Aug. 20, 2024

(54) INTRODUCTION AND DETECTION OF ERRONEOUS STOP CONDITION IN A SINGLE UART

(71) Applicant: Microchip Technology Incorporated, Chandler, AZ (US)

(72) Inventors: Avinash Halageri, Karnataka (IN); Sathya Narayanan, Karnataka (IN)

(73) Assignee: Microchip Technology Incorporated, Chandler, AZ (US)

( * ) Notice: Subject to any disclaimer, the term of this patent is extended or adjusted under 35 U.S.C. 154(b) by 52 days.

This patent is subject to a terminal disclaimer.

(21) Appl. No.: 17/948,616

(22) Filed: Sep. 20, 2022

(65) Prior Publication Data
US 2023/0101045 A1    Mar. 30, 2023

(51) Int. Cl.
H04L 1/00       (2006.01)
(52) U.S. Cl.
CPC .......... H04L 1/0082 (2013.01); H04L 1/0041 (2013.01); H04L 1/0045 (2013.01)
(58) Field of Classification Search
CPC ... H04L 1/0041; H04L 1/0045; H04L 1/0057; H04L 1/0061; H04L 1/0082; H04L 1/246; G06F 13/385
See application file for complete search history.

(56) References Cited

U.S. PATENT DOCUMENTS

| 4,949,333 | A  | * | 8/1990 | Gulick | .............. | H04Q 11/0428 |
| | | | | | | 370/282 |
| 5,661,751 | A  | * | 8/1997 | Johnson | ................ | G06F 1/3215 |
| | | | | | | 375/377 |
| 6,272,452 | B1 | * | 8/2001 | Wu | ........................ | G06F 13/105 |
| | | | | | | 703/24 |

(Continued)

FOREIGN PATENT DOCUMENTS

| EP | 1014273 A2 | 6/2000 | | |
| JP | 5930125 A | 2/1984 | | |
| JP | 2004187117 | * 12/2002 | ............. | H04L 25/02 |

OTHER PUBLICATIONS

Sowmya K B et al., Design of UART module using ASMD technique, IEEE conference record #48766, pp. 176 to 181. (Year: 2020).*

(Continued)

*Primary Examiner* — Shelly A Chase
(74) *Attorney, Agent, or Firm* — SLAYDEN GRUBERT BEARD PLLC

(57) ABSTRACT

A universal asynchronous receiver/transmitter includes a transmission register to include information to be transmitted, a receive register to include information received, a frame error checking circuit to evaluate contents of the receive register for a frame error, and control logic. The control logic is to route the contents of the transmission register to the receive register. The control logic is to, during transmission of the contents of the transmission register through the reprogrammable pin to the receive register, (Continued)

modify a bit inversion register to yield modified contents to be provided to the receive register. The modified contents are to cause a frame error. The control logic is to determine whether the frame error checking circuit detected the frame error.

21 Claims, 3 Drawing Sheets

(56) References Cited

U.S. PATENT DOCUMENTS

| | | | |
|---|---|---|---|
| 9,723,384 B2* | 8/2017 | Obeid | H04Q 11/00 |
| 2004/0085996 A1* | 5/2004 | Sleeman | G06F 13/385 |
| | | | 370/465 |
| 2021/0200615 A1 | 7/2021 | Aune | |

OTHER PUBLICATIONS

Patel et al., VHDL implementation of UART with status register, IEEE, International Conference on Communication Systems and network technologies, pp. 750-754. (Year: 2012).*

International Search Report and Written Opinion, Application No. PCT/US2022/045137, 13 pages, Jan. 24, 2023.

* cited by examiner

INTRODUCTION AND DETECTION OF ERRONEOUS STOP CONDITION IN A SINGLE UART

PRIORITY

This application claims priority to Indian Application No. 202111044129, filed Sep. 29, 2021, the contents of which are hereby incorporated in their entirety.

FIELD OF THE INVENTION

The present application relates to electronic communication and, more particularly, to introduction and detection of an erroneous stop condition in a single universal asynchronous receiver/transmitter (UART).

BACKGROUND

UARTs are used to implement a variety of communication protocols between electronic devices. UARTs may be used for serial communications. The transmission of data by a UART may be framed by start and stop bits in order to facilitate timing between UARTs on different devices.

Different errors may occur in data transmission between UARTs. Such errors may occur from, for example, noise in the sending device, transmission medium, or receiving device, or misconfiguration of one of these elements. One such error may include an erroneous stop condition error. The erroneous stop condition error may cause a frame error. A frame error may arise from, for example, two UARTs communicating at different baud rates.

Inventors of examples of the present disclosure have discovered that tests of UART circuits, devices, and modules often use two or more such UART circuits, devices, or modules. Data is generated by one such UART and received by the other such UART. In order to test the correctness of operation, such as detection of frame errors or stop condition errors, such errors may be artificially created. However, by using a separate UART circuit, device, or module, which may in turn be on a separate microcontroller or system from the original UART circuit, device, or module, inventors of examples of the present disclosure have discovered that this dependence on another UART circuit, device, or module may cause additional errors. Such additional errors may include false positive or false negative results from testing the UART's error testing capabilities. For example, data may be sent from a sending UART to a receiving UART. Test mechanisms in the sending UART may introduce a frame error by, for example, sending an erroneous frame with data sent at a mismatched baud rate. However, this error may go undetected if, for example, noise causes the error to be reversed by the time the frame is received and processed by the receiving UART. In a test or validation of the UARTs, it may appear that the frame error checking is not working correctly, even though such frame error checking is working correctly. Moreover, it may not be clear whether frame error checking of the sending UART is not working correctly, frame error checking of the receiving UART is not working correctly, or if noise is present in the sending UART, transmission medium, or receiving UART.

In another example, a BREAK signal may be sent in a loopback configuration from a transmitter pin to a receiving pin of a UART in order to generate a frame error. However, in such an example, an additional data byte might be sent along with the BREAK signal to cause the frame error. The handling of the frame error may be performed with an interrupt service routine (ISR). Handling of a BREAK signal may also be done with an ISR. These might each also accidentally introduce additional errors through malfunctioning of these handling systems.

In yet another example, a receiver pin on a microcontroller may be driven low in order to induce a frame error. However, the timing for driving the receiver pin low in order to sufficiently cause a frame error may vary according to the baud rate used by the UART under test. Thus, additional complexity may be added so that the technique for introducing the frame error may accommodate different baud rates that might be used by various UARTs.

Inventors of examples of the present disclosure have discovered that the examples of the present disclosure address one or more of these issues.

DETAILED DESCRIPTION

Figure 1:
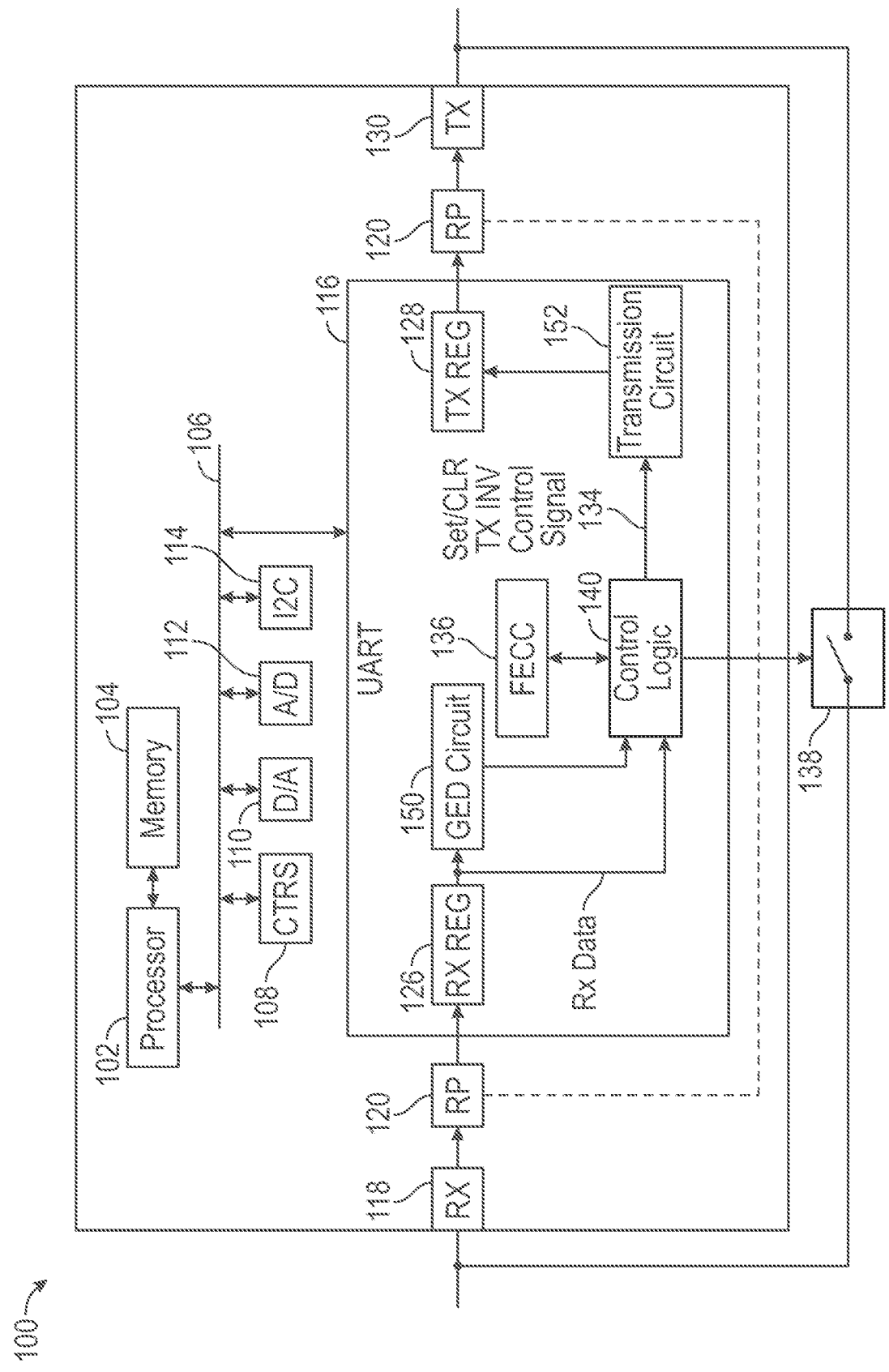
FIG. 1 is an illustration of an example system for introduction and detection of a stop condition error into a UART transmission, according to examples of the present disclosure.

FIG. 1 is an illustration of an example system 100 for introduction and detection of frame error in a single UART, according to examples of the present disclosure. The frame error may be introduced by, for example, introduction of a stop condition error. The stop condition error may include, for example, introduction of a stop bit error. Communication between UARTs may be performed using frames. Each frame may have a start and a stop condition, indicating a beginning to the frame and an end to the frame. The stop condition may be implemented by an expected value in the sequence of the frame. A given UART may detect a framing error when the UART does not see a stop bit at an expected time for the stop bit during the frame transmission. As a start bit is used to identify the beginning of an incoming character or frame, the timing of the start bit may be used a reference for the remaining bits and thus for when the stop bit is expected. If the data line is not in an expected state—such as a logic high—when the stop bit is expected, taking into account the number of data and parity bits for which the UART is set, the given UART may determine a framing error.

System 100 may be implemented within any suitable context, such as within a controller, microcontroller, die, integrated circuit, system on a chip, application specific integrated circuit, field programmable gate array, computer, mobile device, or any other suitable electronic device. In the example of FIG. 1, system 100 may be implemented by a microcontroller.

System 100 may include a UART 116. UART 116 may be implemented by instructions for execution by a processor, analog circuitry, digital circuitry, control logic, digital logic circuits programmed through hardware description language, application specific integrated circuits (ASIC), field programmable gate arrays (FPGA), programmable logic devices (PLD), or any suitable combination thereof, whether in a unitary device or spread over several devices. System 100 may include more instances of UART 116 than are shown. However, a single such UART 116 may be configured to introduce and detect a stop bit error. In the case of multiple instances of UART 116, each of the multiple instances of UART 116 may introduce and detect a stop bit error.

System 100 may include any suitable external ports, such as TX port 130 and RX port 118, for providing communication to or from UART 116. Such ports 130, 118 may be implemented by any suitable electrical connection. In various examples, ports 130, 118 may be the external connections of a die, board, chip, or other packaging of UART 116. Ports 130, 118 may be configured to provide communication between UART 116 and other instances of UARTs on other devices.

System 100 may include any other suitable kind and number of elements. For example, system 100 may include a processor 102 communicatively coupled to a memory 104. Memory 104 may include instructions that, when loaded and executed by processor 102, may implement software to be executed by system 100. System 100 may include a system bus 106. System bus 106 may be configured to provide communication between processor 102 and other parts of system 100, such as UART 116.

In one example, UART 116 may be a peripheral of a microcontroller of system 100. Such a peripheral may perform tasks on behalf of processor 102 and system 100. The tasks may be initiated by a command, user input, software, or other operation of processor 102. Once initiated, such tasks may be performed independently of processor 102 by the peripheral. Thus, processor 102 may offload tasks to such peripherals. When finished with a task, or upon other suitable criteria wherein processor 102 or software executing thereon is to take further action, the peripheral may, for example, generate an interrupt to processor 102. Other possible peripherals of system 100 may include, for example, counters 108, digital to analog converter 110, analog to digital converter 112, or an I2C communication circuit 114.

UART 116 may include control logic 140. Control logic 140 may be implemented by analog circuitry, digital circuitry, instructions for execution by a processor, or any suitable combination thereof. Control logic 140 may be configured to direct and control operations of UART 116 for introducing frame or stop bit errors as described in the present disclosure.

UART 116 may include a receive register such as RXREG 126. RXREG 126 may be configured to store one or more bits of information, including substantive data to be received, frame information, or error information such as parity bits, which are received at UART 116, such as those received through RX port 118. The data received on RX port 118 may typically be received from another instance of a UART, or from UART 116 if configured in a loopback manner. Data in RXREG 126 may be read and used by any suitable portion of system 100, such as by control logic 140.

UART 116 may include a transmitting register such as TXREG 128. TXREG 128 may be configured to store one or more bits of information, including substantive data to be sent, frame information, or error information such as parity bits, which are to be sent by UART 116 through, for example, TX port 130. The data to be stored in TXREG 128 and sent through TX port 130 may be generated by any suitable portion of system 100, such as by control logic 140, software executing on processor 102, or another peripheral of system 100.

UART 116 may include a transmission circuit 152 and an error and event detection circuit 150. Circuits 150, 152 may be implemented by instructions for execution by a processor, analog circuitry, digital circuitry, control logic, digital logic circuits programmed through hardware description language, an ASIC, an FPGA, a PLD, or any suitable combination thereof, whether in a unitary device or spread over several devices. Error and event detection circuit 150 may be configured to detect errors in received frames. Transmission circuit 152 may be configured to cause transmission of contents of TXREG 128, and may be configured to add start and stop bits during transmission.

In one example, UART 116 may be configured to introduce a frame error using resources available within UART 116. In another example, UART 116 may be configured to introduce a frame error without using an additional instance of a UART.

UART 116 may include or be configured to use any suitable loopback or feedback mechanism to tie TX port 130 and RX port 118 together, or the output of TXREG 128 and RXREG 126.

In one example, UART 116 may include or have access to one or more virtual remappable pins. For simplicity of discussion, a singe virtual remappable pin is described herein, it being understood that more than one virtual remappable pin may be provided. Such a virtual remappable pin may be configured to provide connections between or within a given peripheral of system 100, such as UART 116. The virtual remappable pin may be implemented by, for example, a switch fabric internal to UART 116 or between UART 116 and other elements of system 100. In one example, the virtual remappable pin may be implemented by a software-controlled interconnect matrix. The matrix may be implemented wholly within UART 116, or within UART 116 and a larger system in which UART 116 resides such as a microcontroller. The virtual remappable pin may be programmable through control logic 140. Control logic 140 may in turn make programmatic calls to other parts of the system to set the virtual remappable pin. The virtual remappable pin may be programmable to electrically tie, i.e., connect, two ports of UART 116 or system 100. The virtual remappable pin may be used to tie, for example, TX and RX ports or registers together, or an RX port or register to a known signal. For example, UART 116 may include remappable pin RP 120. RP 120 is illustrated outside of UART 116 as if these were physical pins for demonstration purposes. Moreover, illustrated in FIG. 1 are two representations of remappable pin RP 120, provided for readability. The single instance of remappable pin RP 120 is illustrated as separate instances to show the equivalent routing of signals to or from the remappable pins, although these are a single instance. Control logic 130 may be configured to route two or more signals to a same remappable pin. This may have the effect of connecting the two or more signals. This may occur within UART 116 or within system 100. The routing of signals through remappable pin RP 120 may be performed programmatically by control logic 130 by assigning and reassigning remappable pin RP 120. However, for the purposes of illustration, the ability of control logic 130 to route signals through remappable pin RP 120 may be illustrated as a switch 124.

In another example, UART 116 may utilize an external loopback connection using ports 130, 118. Output of TX port 130 may be connected to RX port 118. This may be selectively enabled or disabled with any suitable circuit, such as by a switch 138. Switch 138 may be controlled by, for example, control logic 140.

A frame of data to be sent to TX port 130 or RP 120 may be stored in TXREG 128. The frame of data may be set according to any suitable transmission scheme designed for UARTs. Any suitable underlying data, parity information, start condition, or stop condition may be included. For example, a stop bit or any other suitable stop signal or information within the frame may be used. In a further example, the stop bit may be in a tenth bit position within the frame, following a start bit and eight data bits. In a further example, the stop bit may be expected to be a logic high value.

The examples shown in the present disclosure may follow this scheme. In other examples, the stop bit may be expected to be a logic low value or may appear in other expected positions within a given frame.

The frame information, such as the stop condition, may be set or checked by any suitable portion of UART 116. For example, UART 116 may include a frame error checking circuit 136. Frame error checking circuit 136 may be implemented by instructions for execution by a processor, analog circuitry, digital circuitry, control logic, digital logic circuits programmed through hardware description language, an ASIC, an FPGA, a PLD, or any suitable combination thereof, whether in a unitary device or spread over several devices. Frame error checking circuit 136 may be configured to examine contents of RXREG 126 and evaluate whether a frame error has occurred. As discussed above, such a frame error may arise when a stop condition, such as correct value of a stop bit, is not observed. Frame error checking circuit 136 may be implemented in part by event and error detection circuit 150, or vice-versa.

Frame error checking circuit 136 may be configured to evaluate the contents of RXREG 126 as it was received and determine whether a frame error has occurred. The frame error may be determined when contents of RXREG 126 do not include a stop bit or condition in an expected position. If a frame error has occurred, then UART 116 may take any suitable corrective action. If no frame error has occurred, then UART 116 may continue to process information in RXREG 126.

Control logic 140 may be configured to switch UART 116 between test and normal modes. The test mode may be used on the basis of any suitable criteria. For example, the test mode may be performed upon startup of system 100, periodically, as part of a larger diagnostic test, or on demand by a user or software of system.

During a normal mode of operation, wherein the frame error checking capabilities of UART 116 are not to be tested, output of TXRED 128 might not be routed through RP 120, TX port 130, or RX port 118 back to RXREG 126. Switch 138 may, for example, disconnect a loopback path between TX port 130 and RX port 118. Control logic 140 may be configured to route (not shown) contents of TXREG 128 to TX port 130. The data may be sent from TX port 130 on to other entities (not shown) connected to TX port 130. Furthermore, control logic 140 may be configured to route (not shown) contents from RX port 118 to RXREG 126. Possible frame errors may be checked by frame error checking circuit 136 for data received in RXREG 126. If no frame error is detected, then the data received may be processed. If a frame error is detected, then any suitable corrective action may be taken. These may include, for example, requesting that the sender of the information—such as another UART—resend the data, or notifying a user or software entity of system 100.

During a test mode, wherein the frame error checking capabilities of UART 116 are to be tested, control logic 140 may connect the output of TXREG 128 to an input of UART 116. In one example, control logic 140 may connect the output of TXREG 128 to RP 120, which may be connected to the input of UART 116 for entry into RXREG 126. In another example, control logic 140 may connect the output of TXREG 128 to TX port 130, and TX port 130 to RX port 118, through enablement of switch 138.

During the test mode, control logic 140 may be configured to cause a frame error in a frame issued from TXREG 128 and routed to RXREG 126. In one example, control logic 140 may be configured to cause a frame error in a frame as the frame is issued from TXREG 128. The frame error may be caused by an artificially created incorrect stop condition or stop bit. In another example, control logic 140 may be configured to cause a frame error in a frame as the frame is received at RXREG 126. Control logic 140 may be configured to cause a frame error in a frame in any suitable manner. In various examples, control logic 140 may be configured to change a bit inversion register in order to cause a frame error in a transmitted frame. The bit inversion register may be used to cause an artificially created incorrect stop condition or stop bit. In various examples, control logic 140 may be configured to introduce an erroneous stop bit in a frame in order to cause a frame error. In various examples, control logic 140 may be configured to introduce an erroneous stop bit in a frame in order to cause a frame error by changing a bit inversion register.

Bit inversion may include changing the state of a bit to the opposite state, or evaluating a bit according to its opposite state. A bit inversion register may define whether contents of a given register are to be transmitted or interpreted with bit inversion. Although referred to as a register, the bit inversion register may be implemented in any suitable manner, such as by a single bit, along with any suitable control logic. In one example, UART 116 may include or be communicatively coupled to an inversion bit register for transmission of data. The inversion bit register may define inversion bit transmission or interpretation for any suitable number and kind of registers. For example, whether data of TXREG 126 will be transmitted or interpreted using bit inversion may be defined by TX INV register or control signal 134.

In various examples, control logic 140 may be configured to selectively set TX INV register or control signal 134 in order to cause a frame error. The frame error may be caused by an erroneous stop bit. Control logic 140 may be configured to selectively set TX INV register or control signal 134 in order to cause an error in the stop bit of a given frame to cause the frame error. In one example, control logic 140 may be configured to selectively change a value of TX INV register or control signal 134 in order to cause a stop bit error. In various examples, control logic 140 may be configured to selectively change a value of TX INV register or control signal 134 during transmission of the frame in order to cause a stop bit error. In various examples, control logic 140 may be configured to selectively change a value of TX INV register or control signal 134 during transmission of the frame and after a start bit or start condition in order to cause a stop bit error. In various examples, control logic 140 may be configured to selectively change a value of TX INV register or control signal 134 during transmission of the frame in order to cause a stop bit error. In various examples, control logic 140 may be configured to selectively change a value of TX INV register or control signal 134 during transmission of the frame, after a start bit or start condition, and before the end of the frame, encompassing when the stop bit is expected, in order to cause a stop bit error.

Upon reception of a frame, at the time at which the stop bit is expected, frame error checking circuit 136 may examine the contents of RXREG 126 to determine whether the stop bit is a logical one. A logical one may be expected in a normal, correct transmission. In order to cause a frame error arising from a stop bit error, control logic 140 may be configured to selectively change or cause the change the value of TX INV register or control signal 134 during the transmission of the frame in the test mode. The changed value of the TX INV register or control signal 134 may be configured to artificially cause the stop bit to be a logical zero. This may be performed, as discussed above, in a test mode in order to test the error checking capabilities of UART 116. The logical zero at the time at which the stop bit is expected may cause a frame error to be generated by frame error checking circuit 136.

In various embodiments, a logical zero value might instead be expected at the time for the stop bit.

UART 116 may be implemented as part of, for example, functional safety diagnostics software, where the intention of the diagnostic is to test the functionality of the modules including hardware error detection mechanisms available in the device. This software diagnostic for UART, is used in application software that run in automotive ECUs to check whether the FRAME error detection mechanism in the UART is working. Testing of UART 116 may be tested without dependency upon other UARTs.

Figure 2:
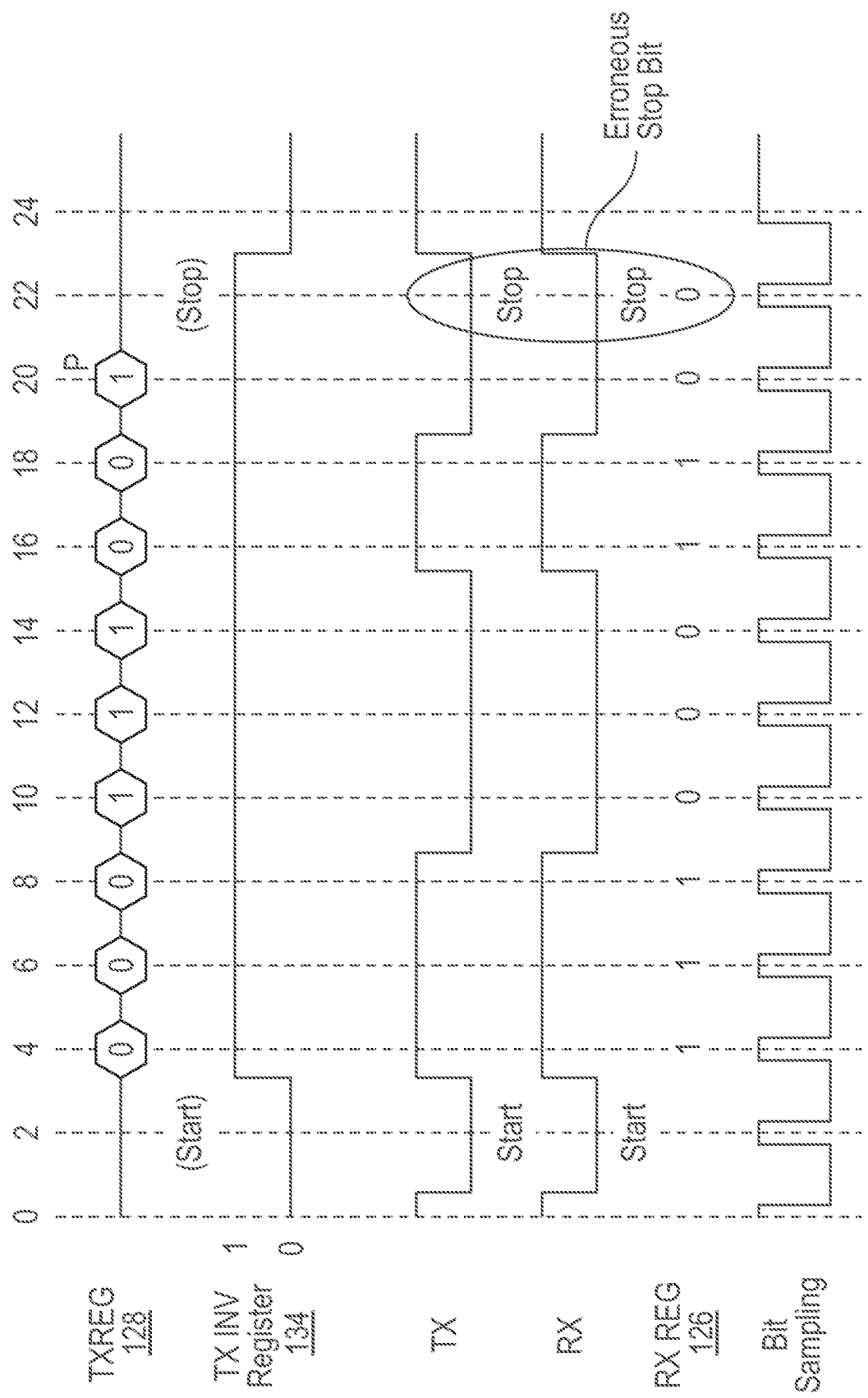
FIG. 2 is a timing diagram of introduction of stop condition error in into a UART transmission with bit inversion of a transmission register, according to examples of the present disclosure.

FIG. 2 is timing diagrams of introduction of stop condition error in into a UART transmission, according to examples of the present disclosure. Propagation delays between various portions of the system are omitted, and transmission is shown as instantaneous, for the simplicity of illustration. The data shown in FIG. 2 may reflect example contents of TXREG 128, which may be generated by, for example, control logic 140 or any other suitable portion of system 100. Shown in FIG. 2 are traces for contents of TXREG 128, TX INV register or control signal 134, the output (denoted as TX) of TXREG 128 as output from UART 116 or within UART 116 to RXREG 126 which may include transmission through RP 120 or TX 130, the input (denoted as RX) to RXREG 126 as input from UART 116 or within UART 116 from TXREG 128 which may include transmission through RP 120 or TX 130, and contents of RXREG 126.

The y-axis may be defined by any suitable time increment. For example, microseconds are shown in FIG. 2.

In the example of FIG. 2, a frame of data including a start condition, data bits of 00011100, a parity bit of 1, and a stop bit of 1 may be sent. This frame may be loaded in TXREG 128.

At 2 microseconds, the frame may begin to be sent from TXREG 128. TX INV register or control signal 134 may be cleared or otherwise set so that bit inversion is not used and affect a start condition. A start condition such as a start bit may be transmitted. The expected and received value at RXREG 126 may be a logic low value for the start bit at 2 microseconds.

At 4 microseconds, data of the frame may begin to be transmitted. The data of the frame may be transmitted for any suitable length of time according to the definition of the transmission protocol and frame data length. For example, eight bits of data may be transmitted. The values of data in the example shown in FIG. 2 in this time range may be disregarded for the purposes of testing a frame error, though the values may be manipulated for other tests, such as a parity error test.

At any point in the transmission of data of the frame, after transmission of the start bit and before transmission of the stop bit, a bit inversion register may be changed in value.

In FIG. 2, TX INV register or control signal 134 may be changed between 2 and 4 microseconds so that bit inversion is applied to the data sent from TXREG 128. TX INV register or control signal 134 may be reset between 22 and 24 microseconds.

As a result, at 22 microseconds, the value of data received at RXREG 126 may be a logic low, rather than a logic high. This may be a stop bit error, and may cause a frame error. Frame error checking circuit 136 observe this condition and may generate a frame error. Control logic 140 may evaluated whether frame error checking circuit 136 correctly generated a frame error in response to the artificially created stop bit error and, if not, take any suitable corrective action.

After the stop bit error is caused, the value of the bit inversion register may again be switched so that the value of the bit inversion register is the same as at 3 microseconds. Accordingly, UART 116 might not interpret a continued logic low value on the received values of TXREG 128 as a break signal.

Figure 3:
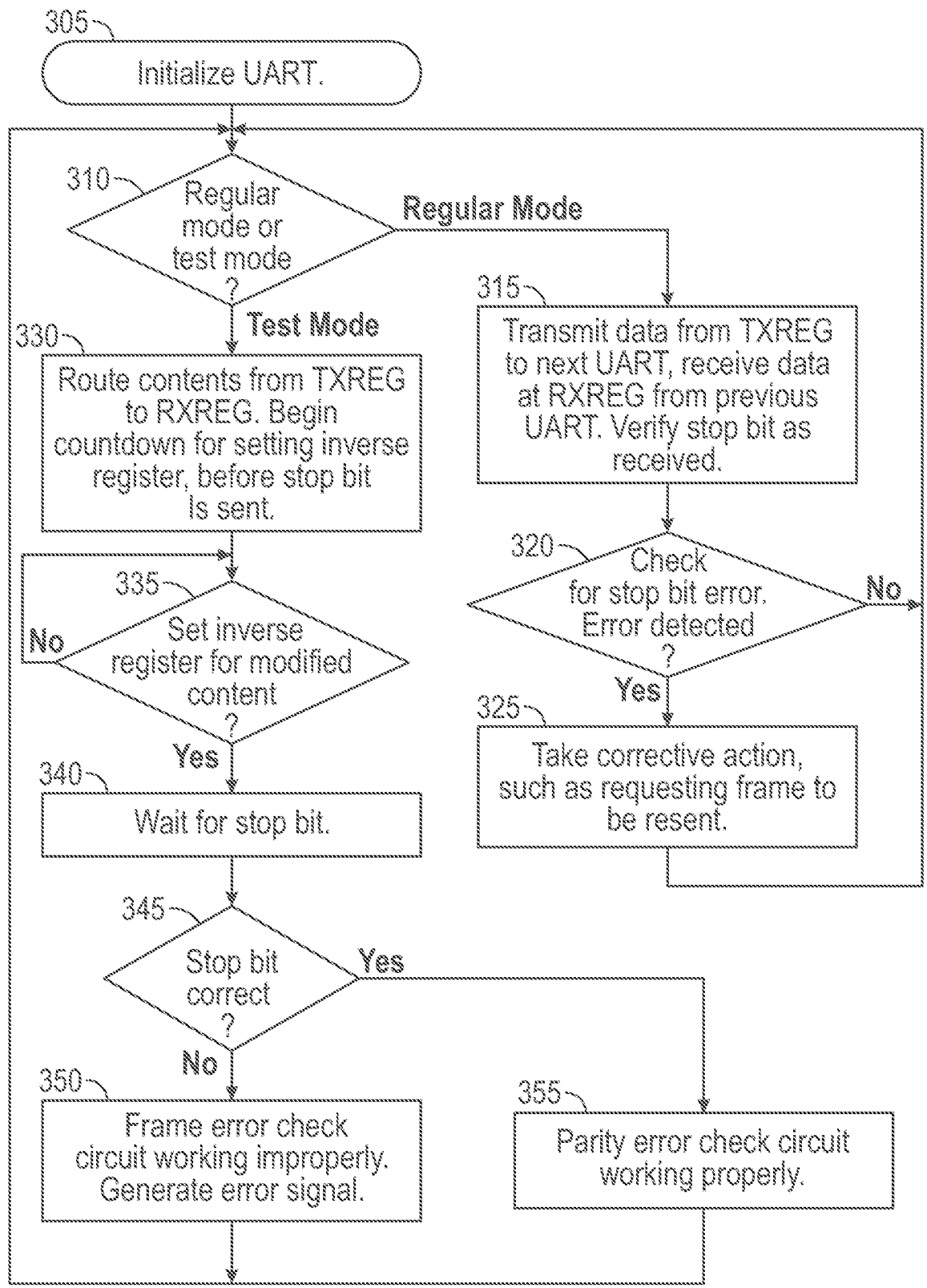
FIG. 3 is an illustration of a method for introduction and detection of a stop condition error into a UART transmission, according to examples of the present disclosure.

FIG. 3 is an illustration of an example method 300 for introduction and detection of a frame error in a UART, i.e., in a single UART, according to examples of the present disclosure.

Method 300 may be performed by any suitable mechanism, such as the system of FIGS. 1-3 and, in particular, control logic 140 and frame error check circuit 136. Method 300 may contain more or fewer steps than shown in FIG. 3. Moreover, various steps of method 300 may be repeated, omitted, skipped, performed in a different order, performed in parallel, or performed recursively.

At 305, a UART may be initialized.

At 310, it may be determined whether the UART is to operate in a normal mode or a test mode. The decision to enter test mode may be made on-demand by a user of the UART, periodically, at start-up, or on any other suitable basis. If the UART is to operate in normal mode, method 300 may proceed to 315. Otherwise, if the UART is to operate in test mode, method 300 may proceed to 330.

At 315, data may be transmitted from the UART to another UART, or data may be received at the UART from another UART. Data to be transmitted may be stored in the TXREG. Data received may be stored in the RXREG. Received data may be checked for expected stop bits.

At 320, it may be determined whether there is a stop bit error. If not, method 300 may return to 310. If so, method 30 may proceed to 325.

At 325, any suitable corrective action may be taken for a stop bit error, such as generating an error signal, generating an alert, or requesting the frame to be resent by the sending UART. Method 300 may return to 310.

At 330, contents of the TXREG may be sent to the RXREG. The contents may be sent through a remappable pin that may be mapped between the TXREG and the RXREG so that output of the TXREG will propagate to the RXREG, or by setting switch 138. A countdown may begin until a suitable time to set a control signal or inverse register, such as TX INV 134. The control signal may be set and sent before a stop bit of TXREG is sent. The control signal may cause the contents sent between TXREG and RXREG to be inverted, which may include the stop bit. The inverted value of the stop bit may cause a stop bit error and more particularly, a frame error.

At 335, it may be determined whether the control signal or inverse register will be set and sent. If so, method 300 may proceed to 340. Otherwise, method 300 may repeat 335 for one or more additional clock cycles.

At 340, the system may wait for the when a stop bit to be propagated to the RXREG.

At 345, it may be determined whether an expected stop bit was received. If so, method 300 may proceed to 355. Otherwise, method 300 may proceed to 350.

At 350, it may be determined that the frame error checking circuit, which performed 345, is working improperly. Any suitable corrective action, such as an alert to a user of the UART, may be performed. Method 300 may return to 310.

At 355, it may be determined that the parity error checking circuit, which performed 350, is working properly. Method 300 may return to 310.

Embodiments of the present disclosure may include an apparatus. The apparatus may include a transmission register to include information to be transmitted by a UART. The apparatus may include a receive register to include information received by the UART. The apparatus may include a bit inversion register or a control signal configured to cause transmitted or received information to be inverted. The apparatus may include a frame error checking circuit configured to evaluate contents of the receive register for a frame error. The apparatus may include control logic configured to route the contents of the transmission register to the receive register. The control logic may be implemented by instructions for execution by a processor, analog circuitry, digital circuitry, control logic, digital logic circuits programmed through hardware description language, an ASIC, an FPGA, a PLD, or any suitable combination thereof, whether in a unitary device or spread over several devices. The control logic may be configured to modify the bit inversion register or issue a bit inversion signal to cause modified contents to be provided to the receive register. The modified contents may be configured to cause a frame error. The control logic may be configured to determine whether the frame error checking circuit detected the frame error.

In combination with any of the above embodiments, the control logic may be configured to determine whether the frame error exists from detection of an erroneous stop bit. The erroneous stop bit may be introduced by the bit inversion register or bit inversion signal. The bit inversion register or bit inversion signal may be handled by a transmission circuit. The error of the frame may be detected by an error and event handling circuit or the frame error checking circuit. The circuits may be implemented by instructions for execution by a processor, analog circuitry, digital circuitry, control logic, digital logic circuits programmed through hardware description language, an ASIC, an FPGA, a PLD, or any suitable combination thereof, whether in a unitary device or spread over several devices.

In combination with any of the above embodiments, the bit inversion register or bit inversion signal may be an inversion bit or a signal for inversion of transmission of the contents of the transmission register.

In combination with any of the above embodiments, the bit inversion register or bit inversional signal may be an inversion bit for inversion of reception of the contents of the receive register.

In combination with any of the above embodiments, the control logic may be to modify the bit inversion register or issue the bit inversion signal after a start bit of the frame is received at the receive register.

In combination with any of the above embodiments, the control logic may be to modify the bit inversion register or issue the bit inversion signal before a stop bit of the frame is expected at the receive register.

In combination with any of the above embodiments, the control logic may be to modify the bit inversion register or issue the bit inversion signal to cause a stop bit error, the stop bit error to cause the frame error.

In combination with any of the above embodiments, the control logic may be to modify the bit inversion register or issue the bit inversion signal to cause the stop bit error through inversion of an expected value at the receive register at a time when the stop bit is expected.

Although examples have been described above, other variations and examples may be made from this disclosure without departing from the spirit and scope of these examples.

We claim:

1. An apparatus, comprising:
   a transmission register to include information to be transmitted by a universal asynchronous receiver/transmitter (UART);
   a receive register to include information received by the UART;
   a frame error checking circuit to evaluate contents of the receive register for a frame error; and
   control logic to:
   route the contents of the transmission register to the receive register;
   modify a bit inversion register or issue a bit inversion signal to cause modified contents to be provided to the receive register, the modified contents to cause a frame error, the bit inversion register or bit inversion signal to cause transmitted or received information to be inverted; and
   determine whether the frame error checking circuit detected the frame error.

2. The apparatus of claim 1, wherein the bit inversion register or bit inversion signal is for inversion of transmission the contents of the transmission register.

3. The apparatus of claim 1, wherein the bit inversion register or bit inversion signal is for inversion of reception of the contents of the receive register.

4. The apparatus of claim 1, wherein the control logic is to modify the bit inversion register after a start bit of the frame is received at the receive register.

5. The apparatus of claim 1, wherein the control logic is to modify the bit inversion register before a stop bit of the frame is expected at the receive register.

6. The apparatus of claim 1, wherein the control logic is to modify the bit inversion register to cause a stop bit error, the stop bit error to cause the frame error.

7. The apparatus of claim 6, wherein the control logic is to modify the bit inversion register to cause the stop bit error through inversion of an expected value at the receive register at a time when the stop bit is expected.

8. A method, comprising, in a universal asynchronous receiver/transmitter (UART), the UART:
   routing contents of a transmission register to a receive register, the transmission register to include information to be transmitted by the UART, the receive register to include information received by the UART;
   modifying a bit inversion register or issuing or a bit inversion signal to cause modified contents to be provided to the receive register, the modified contents to cause a frame error, the bit inversion register or bit inversion signal to cause transmitted or received information to be inverted;
   with a frame error checking circuit, evaluating contents of the receive register for a frame error; and determining whether the frame error checking circuit detected the frame error.

9. The method of claim 8, wherein the bit inversion register or bit inversion signal is for inversion of transmission the contents of the transmission register, and causing modified contents includes inverting the contents of the transmission register.

10. The method of claim 8, wherein the bit inversion register or bit inversion signal is for inversion of reception of the contents of the receive register, and causing modified contents includes inverting the contents of the receive register.

11. The method of claim 8, comprising modifying the bit inversion register or issuing the bit inversion signal after a start bit of the frame is received at the receive register.

12. The method of claim 8, comprising modifying the bit inversion register or issuing the bit inversion signal before a stop bit of the frame is expected at the receive register.

13. The method of claim 8, comprising modifying the bit inversion register or issuing the bit inversion signal to cause a stop bit error, the stop bit error to cause the frame error.

14. The method of claim 13, comprising modifying the bit inversion register or issuing the bit inversion signal to cause the stop bit error through inversion of an expected value at the receive register at a time when the stop bit is expected.

15. A microcontroller, comprising:
   a universal asynchronous receiver/transmitter (UART),
   a transmission register to include information to be transmitted by the UART;
   a receive register to include information received by the UART;
   a frame error checking circuit to evaluate contents of the receive register for a frame error; and
   control logic to:
   route the contents of the transmission register to the receive register;
   modify a bit inversion register or issue a bit inversion signal to cause modified contents to be provided to the receive register, the modified contents to cause a frame error, the bit inversion register or bit inversion signal to cause transmitted or received information to be inverted; and
   determine whether the frame error checking circuit detected the frame error.

16. The microcontroller of claim 15, wherein the bit inversion register or bit inversion signal is for inversion of transmission the contents of the transmission register.

17. The microcontroller of claim 15, wherein the bit inversion register or bit inversion signal is for inversion of reception of the contents of the receive register.

18. The microcontroller of claim 15, wherein the control logic is to modify the bit inversion register or issue the bit inversion signal after a start bit of the frame is received at the receive register.

19. The microcontroller of claim 15, wherein the control logic is to modify the bit inversion register or issue the bit inversion signal before a stop bit of the frame is expected at the receive register.

20. The microcontroller of claim 15, wherein the control logic is to modify the bit inversion register or issue the bit inversion signal to cause a stop bit error, the stop bit error to cause the frame error.

21. The microcontroller of claim 15, wherein the control logic is to modify the bit inversion register or issue the bit inversion signal to cause the stop bit error through inversion of an expected value at the receive register at a time when the stop bit is expected.

* * * * *

UNITED STATES PATENT AND TRADEMARK OFFICE
CERTIFICATE OF CORRECTION

| | | |
|---|---|---|
| PATENT NO. | : 12,068,854 B2 | Page 1 of 1 |
| APPLICATION NO. | : 17/948616 | |
| DATED | : August 20, 2024 | |
| INVENTOR(S) | : Avinash Halageri et al. | |

It is certified that error appears in the above-identified patent and that said Letters Patent is hereby corrected as shown below:

On the Title Page

Item (30), should read:
Foreign Application Priority Data
Sept. 29, 2021 (IN) 202111044129

Signed and Sealed this
Eighth Day of October, 2024

Katherine Kelly Vidal
*Director of the United States Patent and Trademark Office*